July 21, 1964
G. M. CHINN
3,141,376
FLAME-OUT ELIMINATOR
Filed June 13, 1955
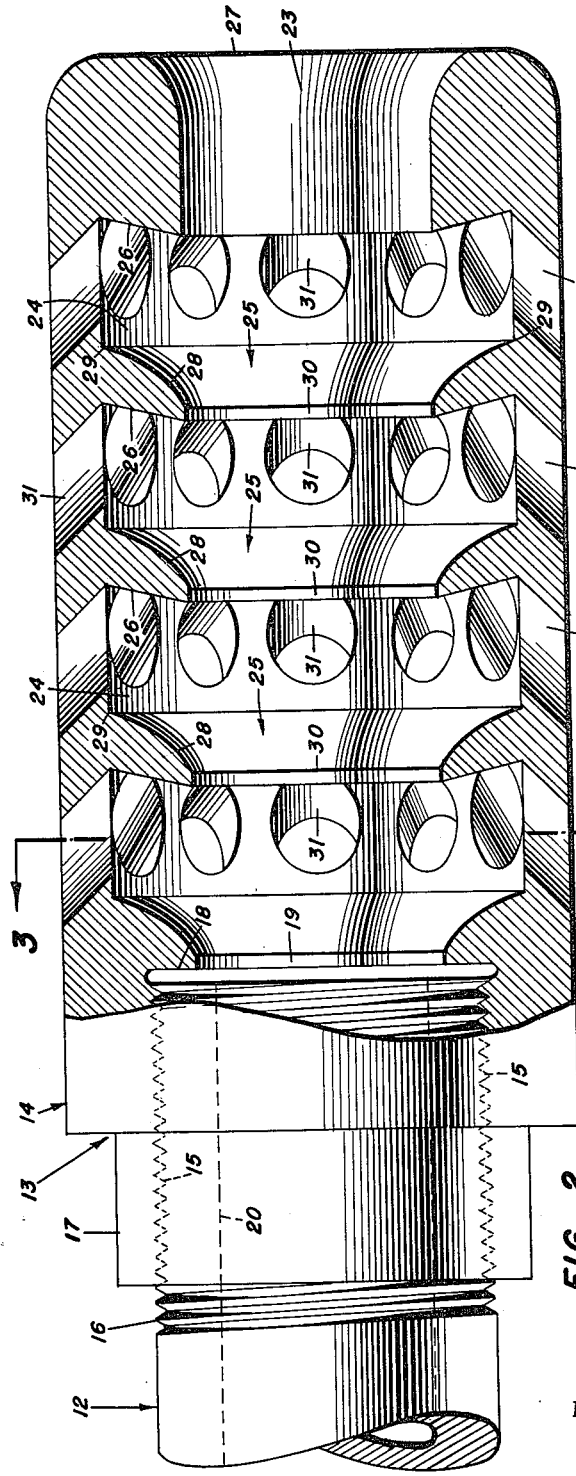
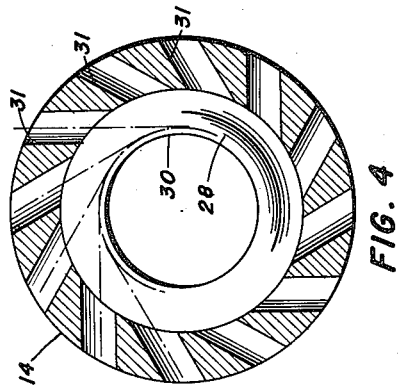
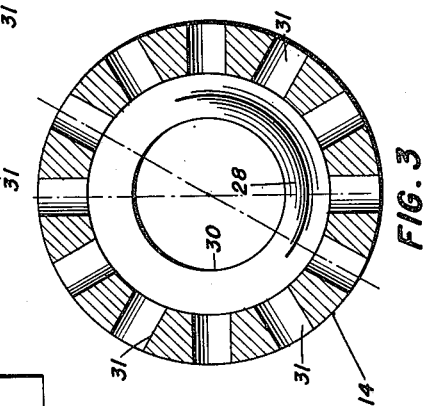
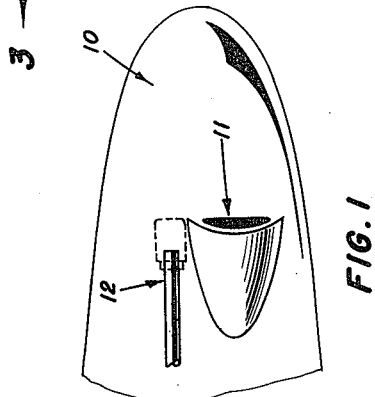
INVENTOR
GEORGE M. CHINN United States Patent Office 3,141,376
Patented July 21, 1964

3,141,376
FLAME-OUT ELIMINATOR
George M. Chinn, 400 Pennsylvania Ave. SE.,
Washington, D.C.
Filed June 13, 1955, Ser. No. 515,268
3 Claims. (Cl. 89—14)
(Granted under Title 35, U.S. Code (1952), sec. 266)

The invention described herein may be manufactured and used by or for the Government of the United States of America for governmental purposes without the payment of any royalties thereon or therefor.

The present invention relates to aircraft guns or cannons and more particularly to an aircraft gun or cannon system which can be used on jet type aircraft without interference or disturbance to the propulsion plant or creating what is commonly known as "flame-out."

In the high speed jet aircraft of today air is fed to the combustion chamber of the jet engine through an air scoop which is generally mounted in the forward portion of the craft. The air scoop is so designed as to provide a desired amount of air as required at various speeds and altitudes and, particularly at high speeds it is important that there be no interference with the air flow into the scoop. Any interruption or disturbance of the normal flow of air into the scoop during operation of the aircraft would seriously hamper the performance of the craft and decrease the flow below that which is required for combustion purposes to result in the extinguishing of the flame in the burner. Such operational failure is generally called "flame-out."

In order to make the present day high speed aircraft a more formidable weapon there has been mounted thereon automatic aircraft guns or cannons which have an extremely high rate of fire. Moreover, in the interest of concentrated fire power, compactness, and firing accuracy it has been found necessary to mount these guns or cannons in the forward portion of the aircraft such that in many instances the ends of the barrels of the guns or cannons are mounted in close proximity to the air scoop of the jet engine. One of the major problems created by such an arrangement is that the firing of the guns or cannons interferes with the normal air flow into the air scoop. That is, when the guns are fired at a high rate the resulting gases are projected forwardly out of the gun barrel into the area of the air scoop, contaminating the air intake and creating a disturbance or turbulence within the critical area of the air intake. Thus, not only is the smooth flow of intake air interrupted and diminished but portions of the gases containing carbon dioxide and unburned explosive material are swept into the combustion part of the jet engine. This, of course, is an extremely hazardous condition and in many cases causes the complete extinguishing of the flame in the jet engine burner resulting in the loss of power to the aircraft and creating the condition known as "flame-out."

Previous atempts have been made to overcome this operating problem. Such devices have generally been built into the aircraft separate and a part from the gun barrel and provide baffles to divert the gases and prevent same from disturbing the normal air flow into the air scoop. However, this arrangement has not proved satisfactory since the baffles are attached to the body of the plane and are relatively stationary in respect to the gun barrel. Also the baffles must be arranged in extremely close juxtaposition to the end of the barrel and the projectile trajectory. It will be seen that during firing the muzzle of the gun is subject to considerable vibration and since the baffles are relatively stationary there is always the possibility of the high explosive projectiles striking part of the baffles and causing considerable damage to the plane and personnel.

The present invention overcomes the disadvantages of the prior art devices by providing a flame-out eliminator which is attached directly to the muzzle of the gun barrel, thus being aligned thereby and eliminating the possibility of the projectile striking the baffle members. Moreover, the baffle members and their cooperating ports are so arranged in the eliminator that the gases are deflected rearwardly along the sides of the barrel substantially 135 degrees from their initial path down the longitudinal axis of the barrel thereby preventing the gases from reaching the critical area surrounding the air intake scoop of the jet engine and subsequently contaminating and disturbing the air flow therethrough.

Accordingly, it is an object of the present invention to provide a more efficient aircraft gun system particularly for use in jet aircraft.

Another object of the present invention is to provide means for diverting the aircraft gun gases rearwardly substantially along the sides of the gun barrel to prevent the projection of such gases beyond the immediate area of the gun barrel.

Still another object is that of providing a "flame-out" eliminator for use with aircraft guns or cannons which aircraft guns or cannons are to be used on jet aircraft.

Another object of the present invention is that of providing a flame-out eliminator to be used on aircraft cannons or guns which are mounted on jet aircraft, said eliminator deflecting and redirecting the gun gases to the rear of the guns to thereby prevent forward movement of the gases into the critical supply area of the air scoop and hence contamination and disturbance of the flow of air into the scoop with subsequent malfunctioning of the jet engine.

Other objects and many of the attendant advantages of this invention will be readily appreciated as the same becomes better understood by reference to the following detailed description when considered in connection with the accompanying drawings wherein:

FIG. 1 is a side elevation view of the forward part of an aircraft showing a common relative disposition of a gun or cannon with respect to the inlet air scoop of a jet aircraft engine;

FIG. 2 is an enlarged longitudinal sectional view of one form of muzzle attachment adapted for use in the present invention;

FIG. 3 is a transverse sectional view of the attachment taken along line 3—3 of FIG. 2; and FIG. 4 is a transverse sectional view of a modified form of the attachment of FIG. 2.

In FIG. 1 there is disclosed the general arrangement of the forward part of a jet aircraft fuselage designated by the numeral 10 having mounted thereon an air scoop 11 and an aircraft gun or cannon barrel 12. Particular attention is directed to the relative positioning of the air scoop and the gun barrel and in this regard it will readily be seen that except for the present invention shown in dotted lines the gases produced during the high rate of fire would be projected out beyond the front of the air scoop member and into the intake path of the air scoop, thus contaminating the intake and creating a turbulence in the critical area surrounding same. As previously mentioned such contamination and interference seriously retards the operation of the jet engine and can upon occasion completely extinguish the burner flame.

In FIG. 2 there is illustrated in enlarged form a suitable attachment 13 forming part of the present invention which in this embodiment comprises a hollow cylindrical body 14 having an internal threaded portion 15 at one end for engagement with a corresponding threaded portion 16 of the gun barrel 12. The external surface 17 of the cylindrical body adjacent the outer end of the internal threaded portion 15 may be shaped for cooperation with a wrench or the like to provide a tightening means for securing the eliminator 13 onto the gun barrel. In this embodiment the inner end of the threaded portion 15 terminates at the base of an annular flange or shoulder 18 having an internal diameter 19 less than the internal diameter of the threaded portion 15 and greater than the diameter of the bore 20 of the gun.

The cylindrical body 14 has a centrally disposed bore 23 which opens into the threaded portion 15, the diameter of the bore 23 being equal to the internal diameter 19 of the annular flange or shoulder member 18. Longitudinally spaced along the bore are a plurality of annular grooves or channel members 24 the common walls of which form annular baffle or rib members or lands 25. The forward lateral or radial walls or faces 26 of each of the grooves or channel members are cut or pitched in a forward direction toward the muzzle end 27 of the eliminator to form an undercut portion at the forward end of each of the channels or grooves. The rearward walls or faces 28 of the grooves 24 are rounded inwardly from the base 29 of the grooves to form the relatively narrow internal edges 30 of the baffle members 25. Each of the grooves or channel members has a plurality of radially and rearwardly directed ports 31 forming passages from the channel member to the outside of the cylindrical body.

It will be noted that the ports are directed rearwardly from the grooves such that the gases which are trapped and deflected by the baffle members within the channels are thus subsequently passed to the outside of the eliminator by the ports and are accordingly directed in a rearward direction along the outside of the barrel. The ports 31 are equally spaced about the circumference of the body 14 and the longitudinal center line of each port intersects the longitudinal center line of the bore as shown in FIG. 3. In the embodiment disclosed in FIG. 4 it will be seen that the ports 31 are formed such that the longitudinal center line of each port is on a bias to the axis of the bore so that the pressure or thrust of the emerging gases sets up a turning moment on the body in the direction of the screw threads and therefore tends to retain the eliminator in place on the gun barrel.

One of the primary functions of the present invention is quickly to trap, deflect and redirect the gun gases so that they will never be projected forwardly beyond the gun barrel. Hence, it is important that the grooves, baffles and ports be of such width, depth and size and so spaced and arranged that the gases entering the eliminator will quickly and effectively be trapped, deflected and redirected rearwardly along the outside of the gun barrel. To accomplish this objective the channels are relatively few in number and rather wide as compared to the length of the eliminator. Moreover, the curvature of the rearward wall of each groove or channel provides for an enlarged mouth portion which permits freedom for flow of the gases into the channel area. Also, it will be seen that the inner openings of the ports 31 are ovate in form where they join the grooves and are so arranged that the leading edges of the ports are coterminous with the base of the forward wall of each groove. In this manner substantially all of the groove base is vented to the outside. Additionally, the forward walls are so slanted and inclined that they provide a maximum trapping and deflecting function in regard to the high velocity escape gases.

The eliminator of the present invention deals with gases having an extremely high velocity rate and the actual behavior of such gases under firing conditions is still not entirely understood. However, it is believed that the following conditions take place during the operation of the device. The gases which propel the projectile from the barrel may be considered as two groups. First, the initial gases which are directly behind the projectile and do the majority of the work. These gases may be considered as the primary or vicious gases since they have an extremely high velocity rate and tend to travel a great distance beyond the gun barrel after the projectile emerges therefrom. It is the vicious gases which for the most part are dangerous and therefore must be redirected by the eliminator. The second group are those gases which follow the vicious gases. While the velocity of the second group of gases is somewhat less than the first group, nevertheless their velocity and volume is such that they must also be prevented from emerging from the gun barrel in an unburned state at a location where a secondary explosion of such gases might interfere with air intake into the jet engine.

As the base of the projectile moves past the wall of the first groove of the eliminator the vicious gases may for the first time be crowded laterally at an angle of approximately 45 to 55 degrees to the longitudinal center line of the bore. Most of these gases will be deflected by the forward slanted wall of the groove directly outward through the ports, while some may be deflected back toward the longitudinal center line of the bore. When these latter gases meet at the center of the bore it is believed that they may set up a turbulence and in effect create a primary gas barrier to the remaining oncoming gases. This barrier tends to retard the velocity of the remaining oncoming gases such that they may more easily be trapped and redirected to the outside. It is believed that these conditions are repeated at each groove or channel as the gases pass along the interior of the eliminator. It has been found in actual operation of the present invention that substantially all of the gases are removed or eliminated by the first, two or three grooves or channels, that few gases reach the remaining channels and none of the gases proceed as far as the muzzle end of the eliminator. This has been determined by high speed photography and by actual use on jet aircraft traveling at high speed.

It is to be understood that the specific size and arrangement of the elements of the eliminator varies with the type of gun or cannon with which it is to be used. Obviously, the larger the cannon or gun the larger the explosive used and therefore the greater will be the volume of gases which are to be captured and redirected. The embodiment disclosed in the present drawings has been specifically designed for use with a 20 mm. aircraft cannon. For such cannon it has been found that an eliminator having the following dimensions has proved extremely efficient and satisfactory in preventing the firing of the cannon or gun from interfering with the operation of the jet engine. The present flame-out eliminator designed for use with the 20 mm. aircraft gun has an overall length of 5.73". The internal diameter of the bore is 1" and the length of the bore is approximately 3.4". The base of each of the channel or groove members is approximately ½" in width and said channel members are spaced longitudinally of the bore such that the distance between each of the grooves or channel members or the base of the common wall therebetween is approximately .20". The vertical depth of each of the channel or groove members is .60". The grooves are cut or pitched forwardly such that the plane of the forward wall forms an angle of approximately 14 degrees with the vertical plane of the bore. The rear walls have a curvature of .5" radius such that the thickness of the internal edge of the baffles is .040". The diameter of the ports is .312" and the longitudinal axis of each port forms an angle of 45 degrees with the vertical plane of the bore. In the specific embodiment presented there are four channels or grooves in the bore, each channel or groove having 12 ports equally spaced circumferentially around its base portion.

Obviously many modifications and variations of the present invention are possible in the light of the above teachings. It is therefore to be understood that within the scope of the appended claims the invention may be practiced otherwise than as specifically described.

What is claimed is:

1. In combination with a jet type aircraft having an engine air inlet and a gun mounted in a position adjacent the air inlet thereof, a gun barrel blast deflecting device secured to the muzzle end of the gun and having a central bore coaxial with the gun bore, said blast deflecting device having cylindrical walls and circumferential, longitudinally spaced inwardly and rearwardly extending lands, said walls being separated from one another by said lands to define a plurality of independent, uniform size, annular gas collecting chambers longitudinally spaced along the central bore, portions of each of said walls defining a group of circumferentially arranged, rearwardly directed ports providing communication between the interior and exterior of the gas collecting chamber individual to such group, the lands of each of said collecting chambers forming at the forward end of said chamber a rearwardly inclined gas deflecting face and at the rearward end of such chamber a convex inwardly rounded face, the rearwardly inclined face of each of said lands being coterminous with the forward edge of each of said ports of the respective group of ports next adjacent thereto.

2. In combination with a jet type aircraft having a gun and an air scoop disposed in close proximity to the gun barrel, a flame-out eliminator comprising a gun muzzle blast deflecting device having a centrally disposed bore, the diameter of which is substantially greater than the internal diameter of the gun barrel, said blast deflecting device having annular walls of uniform diameter and circumferential, longitudinally spaced, inwardly and rearwardly extending lands, said walls being separated from one another by said lands to define a plurality of independent annular grooves of uniform diameter longitudinally spaced along the bore, the forward walls of said grooves being inclined forwardly and outwardly to form an undercut face at the forward end of each of the grooves, the annular wall of each groove having a group of ports spaced around its circumference providing communication between the interior and exterior of the groove individual to such group and uniformly inclined in a rearward direction, said ports being so formed that the forward edge of each of said ports in any one group is coterminous with said undercut face at the forward end of its respective groove whereby gases impinging on said face will be immediately directed outwardly and rearwardly through said ports.

3. In combination with a jet type aircraft having an air scoop and muzzle end of a gun in close proximity thereto, a device for preventing disturbance and contamination of air entering said air scoop due to gases from said gun comprising a blast and shockwave deflector mounted on the muzzle end of the gun barrel and having a central bore coaxial with the gun bore and of greater diameter than the latter, said device having annular walls of uniform diameter and defining a plurality of longitudinally spaced groups of circumferentially arranged uniform ports extending through said walls and providing rearwardly uniformly directed discharge passages for said gases from said central bore, annular gas deflecting lands longitudinally spaced between each of said groups of ports, said lands having an internal diameter equal to and defining said central bore, said lands having forward and rearward faces converging inwardly, the forward and inner edges of each passage of any one group of ports being coterminous with the outer edge of the rearward face of the next adjacent deflecting land in the forward direction, the rearward face of each of said gas deflecting lands being pitched in a forward direction at its outer periphery to form an undercut contiguous to the forward edges of said group of ports individual thereto, and wherein the forward face of each of said gas deflecting lands is arcuately formed to converge in a convex manner inwardly toward its central bore.

References Cited in the file of this patent

UNITED STATES PATENTS

| 785,973 | McClean | Mar. 28, 1905 |
| 817,134 | Smith | Apr. 3, 1906 |
| 2,206,568 | Hughes | July 2, 1940 |
| 2,402,632 | Ivanovic | June 25, 1946 |
| 2,453,121 | Cutts | Nov. 9, 1948 |
| 2,787,194 | Peterson | Apr. 2, 1957 |

FOREIGN PATENTS

| 6,701 | Great Britain | 1899 |